US008935683B2

(12) United States Patent
Brackman (10) Patent No.: US 8,935,683 B2
(45) Date of Patent: Jan. 13, 2015

(54) INLINE FUNCTION LINKING (75) Inventor: David S. Brackman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 13/090,462

(22) Filed: Apr. 20, 2011

(65) Prior Publication Data
US 2012/0272224 A1 Oct. 25, 2012

(51) Int. Cl.
G06F 9/45 (2006.01)
G06F 9/445 (2006.01)

(52) U.S. Cl.
CPC .............. G06F 9/44521 (2013.01); G06F 8/54 (2013.01)
USPC .......................................... 717/159; 717/151

(58) Field of Classification Search
CPC ................................ G06F 8/54; G06F 9/44521
USPC .................................................. 717/140–167
See application file for complete search history.

(56) References Cited

U.S. PATENT DOCUMENTS

| | | | |
|---|---|---|---|
| 5,999,737 A | 12/1999 | Srivastava | |
| 6,718,543 B2 | 4/2004 | Arai et al. | |
| 7,657,871 B2 * | 2/2010 | Velupillai | 717/121 |
| 7,720,662 B1 * | 5/2010 | Aldrich | 703/13 |
| 8,370,822 B2 * | 2/2013 | Sazegari et al. | 717/152 |
| 8,677,329 B2 * | 3/2014 | Beretta et al. | 717/140 |
| 2003/0115580 A1 * | 6/2003 | Arai et al. | 717/158 |
| 2005/0289519 A1 * | 12/2005 | Sazegari et al. | 717/136 |
| 2007/0022418 A1 * | 1/2007 | Velupillai | 717/168 |
| 2007/0157178 A1 | 7/2007 | Kogan et al. | |
| 2007/0250825 A1 | 10/2007 | Hicks et al. | |
| 2008/0276262 A1 | 11/2008 | Munshi et al. | |
| 2009/0249492 A1 * | 10/2009 | Boesgaard Sorensen | 726/27 |
| 2010/0125836 A1 * | 5/2010 | Sazegari et al. | 717/151 |
| 2010/0313079 A1 * | 12/2010 | Beretta et al. | 714/48 |

OTHER PUBLICATIONS

Beazley et al., "The Inside Story on Shared Libraries and Dynamic Loading," Computing in Science & Engineering 3(5): 90-97, 2001.
Gummaraju et al., "Twin Peaks: A Software Platform for Heterogeneous Computing on General-Purpose and Graphics Processors," Proceedings of the 19th International Conference on Parallel Architectures and Compilation Techniques (PACT), pp. 205-216, Sep. 11-15, 2010, Vienna, Austria.
AMD Accelerated Parallel Processing OpenCL™ Programming Guide, revision 1.2, Jan. 2011, 180 pp.
(Continued)

Primary Examiner — Qing Chen
(74) Attorney, Agent, or Firm — James R. Gambale, Jr.

(57) ABSTRACT

In general, techniques are described for performing a form of inline dead code elimination. An apparatus comprising a storage unit and a processor may implement these techniques. The storage unit stores two source files and a destination file. The processor copies a first one of the source files to the destination file. This first source file includes a reference to a portion of a second one of the source files. The processor then evaluates the destination file to determine whether the portion of the second source file referenced in the first source file is used by the destination file. Based on the determination that the portion of the second source file referenced in the first source file is used by the destination file, the processor selectively copies the portion of the second source file to the destination file to generate an updated destination file.

46 Claims, 4 Drawing Sheets

(56) References Cited

OTHER PUBLICATIONS

PowerPoint presentation by Dominik Behr: AMD GPU Architecture OpenCL™ Tutorial, PPAM 2009, Sep. 13, 2009, 28 pp.

PowerPoint presentation by Denys Vlasenko: "Link time dead code and data elimination using GNU toolchain,"CELF Embedded Linux Conference 2010, 18 pp.

Section 14.7 of "Building a Runnable Program:" Chapter 14 of Programming Language Pragmatics by Michael L. Scott, Elsevier Publishing, accessed Sep. 10, 2010 at http://www.elsevierdirect.com/companions/9780123745149/appendices/data/chapters/14b_dynlk.pdf, 6 pp.

Munshi (editor), The OpenCL Specification, version 1.1, document revision 36, Khronos OpenCL Working Group, last revised Sep. 30, 2010, 379 pp.

International Search Report and Written Opinion—PCT/US2012/034259—ISA/EPO—Jul. 13, 2012.

Karimi et al., "A Performance Comparison of CUDA and OpenCL", arXiv.org, Aug. 12, 2010, XP002678354, Retrieved from the Internet: URL: http://arxiv.org/vc/arxiv/papers/1005/1005.2581v2.pdf.

Patel, "LLVM Link Time Optimization: Design and Implementation", Internet citation, Nov. 20, 2006, pp. 1-3, XP002678353, Retrieved from the Internet: URL: http://web.archive.org/web/20101207044141/http://llvm.org/releases/1.9/docs/LinkTimeOptimization.html.

* cited by examiner

INLINE FUNCTION LINKING

TECHNICAL FIELD

This disclosure relates to computing devices and, more particularly, the generation of instructions for execution by computing devices.

BACKGROUND

A computer programmer generally creates software programs using a high-level programming language, such as C++, JAVA, VISUAL BASIC, or the like. The computer programmer may define his/her own functions within the computer program using the high-level programming language or may rely on libraries of functions that are already defined and provided to the computer programmer via the programming environment. For example, a computer programmer may develop his/her own functions to create a user interface or rely on functions specified in libraries of functions (which are usually referred to as "libraries") provided by MICROSOFT, APPLE or other operating system developers. These libraries are often large and the computer programmer generally only uses a small subset of the functions made available by these libraries when coding any one program. In this sense, the libraries may be large but sparsely utilized on a per-program basis.

Once the computer programmer has finished writing a computer program using the high-level programming language, the computer programmer invokes a computer program, referred to as a compiler, to reduce the high-level code to lower-level code, outputting the lower-level code in the form of a destination file. This lower-level code is often referred to as "intermediate representation" or "IR" code. The compiler may perform some forms of optimization on the IR code to reduce the size of the IR code. For example, the compiler may determine that one or more functions of the original high-level code will never be executed during operation (such as debugging functions) and removes portions of the IR code to remove these functions. The compiler then translates the IR code into compiled code, which may be IR code written in a different IR programming language or machine or assembly language code executable by a computing device. The compiler may then output the compiled code along with link data defining how to link this compiled code with the one or more libraries referenced and used by the high-level code.

A program referred to as a "linker" receives the compiled code and the data defining how to link this compiled code with the libraries. The linker then copies the libraries into the correct location relative to the compiled code in accordance with the link data provided by the compiler. In essence, this linker may represent a symbol-based copier, as the libraries and compiled code are nothing more than abstract symbols to the linker, in that it does not perform any form of syntax, semantic or other checks, optimization or the like. The linker copies these libraries in their entirety into the compiled code to form destination data. The libraries include compiled code defining the various functions so that these do not need to be compiled by a compiler again. In this way, the linker may arrange disparate data from multiple sources, e.g., libraries and user-defined compiled code, into a destination data, which may eventually be output as a destination file. The destination file may comprise an executable file in some instances.

As noted above, these libraries are large and may typically include tens, hundreds, if not thousands of functions. Moreover, the user-defined code may only sparsely utilize these functions in that this code only utilizes a small subset or percentage of the functions provided by the library. Considering that libraries of this size may require significant amounts of memory when copied into the destination file, the linker may invoke a computer program referred to as a "link time optimizer" to perform dead code elimination so as to reduce the amount of memory consumed by the resulting libraries and user-defined code. The link time optimizer may copy the libraries over to the executable file and then evaluate the destination file to eliminate any dead code, i.e., code that would not be reachable during execution. However, this linker-level dead code elimination often takes a large amount of time and involves significant processing power that consumes a substantial amount of energy, as a result of having to evaluate potentially thousands of functions to determine whether these functions are invoked or, in other words, used. As a result of these inefficiencies, the linker-level dead code elimination is often limited in its applicability especially when this form of linker-level dead code elimination is required to be implemented in real-time or near real-time or by power-sensitive devices, such as mobile phones, mobile media players, mobile gaming devices and the like.

SUMMARY

In general, this disclosure describes techniques for providing a form of "lazy" linking that copies libraries reachable by the user-defined code without first copying an entire library of functions into the destination file. In this way, the techniques of this disclosure may avoid expensive memory copies (and thereby may reduce power consumption by avoiding these memory copies) by copying only what is reachable by the user-defined code. Hence, the techniques may identify libraries that are reachable by the user-defined code, and copy the identified libraries. Accordingly, the technique may avoid copying an entire library of functions into the destination file. Moreover, the techniques of this disclosure may perform an inline form of dead code elimination in that code is eliminated by virtue of only copying what is reachable. Thus, rather than perform an after-the-fact form of dead code elimination, in which code is eliminated after copying the entire library, and linking this library with the user-defined compiled code, the techniques discussed in this disclosure may avoid copying at least some of the entire library to exclude at least some functions that are not reachable. In some examples, the technique may be only copy those functions that are reachable.

In one example, a method for copying data from two source files to a destination file is described. The method comprises copying a first one of the two source files to the destination file with a processor, wherein the first one of the source files includes a reference to a portion of a second one of the two source files and evaluating, with the processor, the destination file to determine whether the portion of the second one of the two source files referenced in the first one of the two source files is used by the destination file. The method also comprises, based on the determination that the portion of the second one of the two source files referenced in the first one of the two source files is used by the destination file, selectively copying the portion of the second one of the two source files to the destination file with the processor to generate an updated destination file.

In another example, an apparatus for copying data from two source files to a destination file is described. The apparatus comprises means for copying a first one of the two source files to the destination file, wherein the first one of the source files includes a reference to a portion of a second one of the two source files, means for evaluating the destination file to determine whether the portion of the second one of the two source files referenced in the first one of the two source files is used by the destination file and, based on the determination that the portion of the second one of the two source files referenced in the first one of the two source files is used by the destination file, means for selectively copying the portion of the second one of the two source files to the destination file to generate an updated destination file.

In another example, an apparatus for copying data from two source files to a destination file is described. The apparatus comprises a storage unit that stores the two source files and the destination file and one or more processors that copy a first one of the two source files to the destination file, wherein the first one of the source files includes a reference to a portion of a second one of the two source files, evaluate the destination file to determine whether the portion of the second one of the two source files referenced in the first one of the two source files is used by the destination file and, based on the determination that the portion of the second one of the two source files referenced in the first one of the two source files is used by the destination file, selectively copy the portion of the second one of the two source files to the destination file to generate an updated destination file.

In another example, a non-transitory computer-readable medium comprising instructions that, when executed, cause one or more processors to copy a first one of the two source files to the destination file with a processor, wherein the first one of the source files includes a reference to a portion of a second one of the two source files, evaluate, with the processor, the destination file to determine whether the portion of the second one of the two source files referenced in the first one of the two source files is used by the destination file and, based on the determination that the portion of the second one of the two source files referenced in the first one of the two source files is used by the destination file, selectively copy the portion of the second one of the two source files to the destination file with the processor to generate an updated destination file.

The details of one or more examples are set forth in the accompanying drawings and the description below. Other features, objects, and advantages will be apparent from the description and drawings, and from the claims.

DETAILED DESCRIPTION

Figure 1:
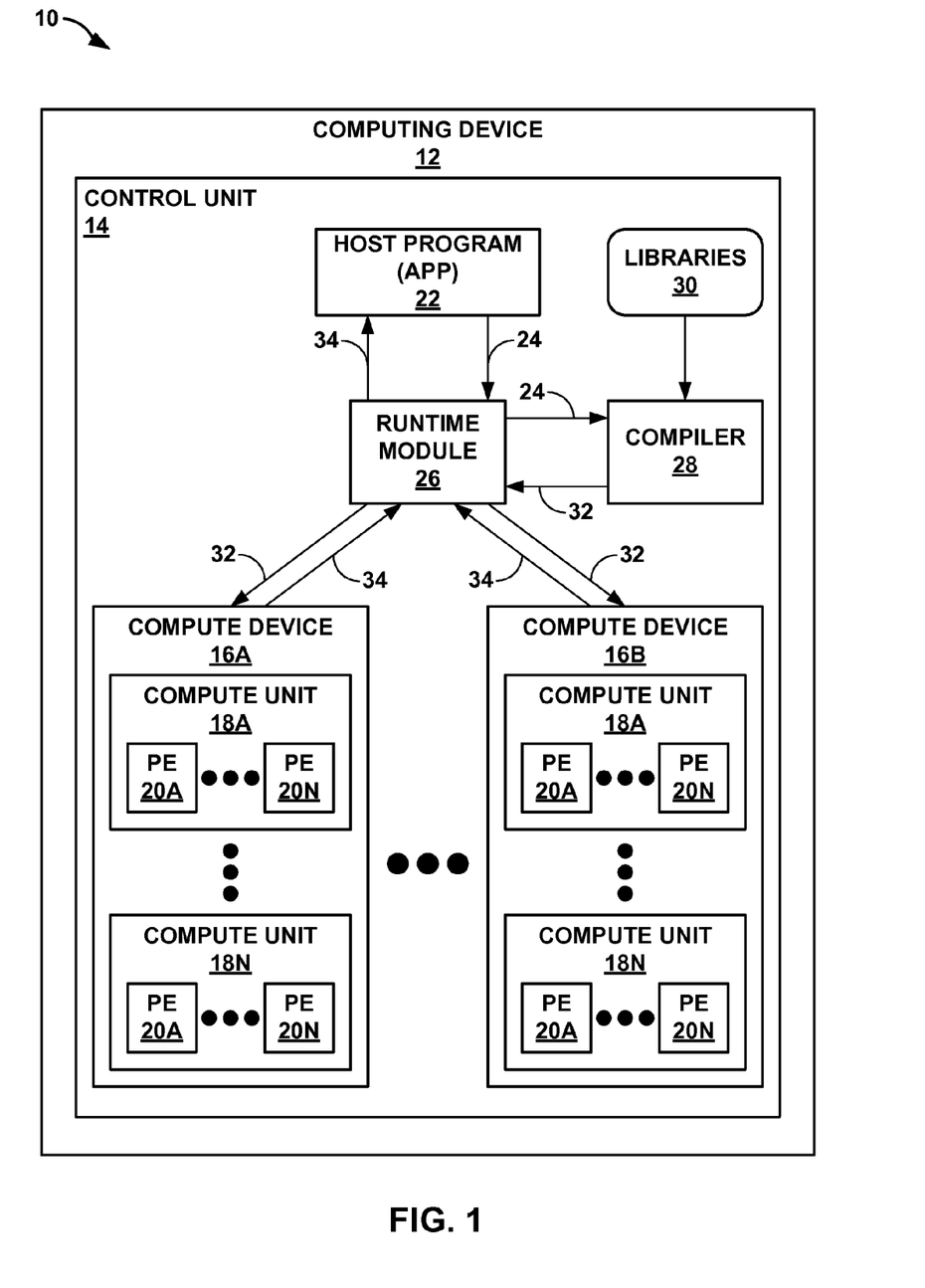
FIG. 1 is a block diagram illustrating an example computing device that implements inline dead code elimination techniques described in this disclosure.

FIG. 1 is a block diagram illustrating an example computing device 12 that implements the inline dead code elimination techniques described in this disclosure. Computing device 12 represents any type of device that is capable of executing applications, such as a desktop computer, a laptop computer, a cellular phone or handset (including so-called "smart phones"), a so-called "netbook," a workstation, a slate or tablet computer, a personal digital assistant (PDA) device, a global positioning system (GPS) device, a personal media player (PMP) device, a gaming device, a television set-top box, or any other similar type of computing device. While the techniques may be generally implemented by any type of computing device, computing device 12 is assumed for purposes of illustration to represent a mobile device and, more particularly, a cellular phone that is capable of executing applications (which are commonly referred to as "apps"), such as a smart phone.

In the example of FIG. 1, computing device 12 includes a control unit 14. Control unit 14 may represent one or more processors (not shown in FIG. 1) that execute software instructions, such as those used to define a software or computer program, stored to a computer-readable storage medium (again, not shown in FIG. 1), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 14 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 14 includes compute devices 16A-16N ("compute devices 16"). Compute devices 16 each represent an abstraction of an underlying execution unit of computing device 12. Each of computing devices 16 may represent, for example, a central processing unit (CPU), a graphics processing unit (GPU), a digital signal processor (DSP), or any other type of processor or hardware unit capable of executing instructions. Each of compute devices 16 includes a respective one or more of compute units 18A-18N ("compute units 18"). For compute units 18 associated with compute devices 16 that represent CPU's, compute units 18 each represent a processing unit or so-called "core" in instances where the corresponding one of compute devices 16 represents a so-called "multi-core processor." A multi-core processor is a processor that includes two or more processors, which are referred to as "cores" in this multi-core context, integrated into a single integrated circuit die or that are provided using multiple circuit dies but that share a single chip package. Those of compute devices 16 that represent a multi-core processor express each of these cores as a different one of corresponding compute units 18. Each of compute units 18 may further each include one or more processing elements (PEs) 20A-20N ("processing elements 20" or "PEs 20"). Each of processing elements 20 represents a thread processor, as many processors or "cores" in the context of multicore processors may be multithreaded, meaning that these processors may execute multiple hardware threads at once and/or virtualize execution of multiple hardware threads at once.

For compute units 18 associated with compute devices 16 that represent GPUs, compute units 18 may represent single instruction multiple data (SIMD) processing units. Many GPUs may include multiple SIMD processing units, each of which includes processing elements 20 in the form of thread processors. In this sense, compute devices 16, compute units 18 and processing elements 20 represent a hierarchical abstraction of the underlying CPUs, GPUs and other processing units of computing device 12. This abstraction provides for a framework in which any type of underlying computing unit may be represented such that an application can be executed across different computing units. A coding language referred to as "Open Computing Language" or "OpenCL" provides this abstraction to enable execution of a single application across different computing units.

That is, OpenCL provides a framework for writing or otherwise coding programs, such as host program 22 (which may be referred to as an application 22 or app 22), that are capable of being executed across heterogeneous platforms consisting of CPUs, GPUs, and any other type of processor, such as a digital signal processor (DSP). OpenCL includes a programming language that is based on another program language commonly known as C99 (which itself is a modern adaption of the C programming language) for writing so-called "kernels." These kernels represent OpenCL functions that are capable of being executed by computing devices that support OpenCL, such as computing device 12. OpenCL also defines an application programming interface (API) that is used by developers to define and then control the platform. The OpenCL API may provide an interface by which to identify a computing context or, in other words, identify compute devices 16, compute units 18 and processing elements 20. The OpenCL API may also provide an interface by which to control this computing context. For example, the OpenCL API may provide an interface by which a developer may assign kernels to identified compute devices 16, compute units 18 and/or processing elements 20 to control the execution of the kernel.

In the example of FIG. 1, control unit 14 executes host program 22, which includes one or more kernels 24. As described above, host program 22 is assumed for purposes of illustration to represent an OpenCL host program that includes one or more OpenCL kernels 24. These kernels 24 may each represent a source file that is defined by a user. In this sense, kernels 24 may be considered as user-defined source files. The OpenCL framework provides for a real-time or near-real-time form of compilation that may be referred to as just-in-time (JIT) compilation. JIT compilation involves compiling source code writing in a high-level programming language, such as C99, immediately before the execution of the resulting compiled code, hence the name just-in-time compilation. JIT compilation may be employed in instances where host program 22 may be executed across a wide number of different platforms. Rather than pre-compile all of the code in host program 22 for each of the different platforms prior to distribution of host program 22 (which is both time consuming and may result in hundreds of different compiled versions of host program 22), developers may develop and pre-compile certain aspects of host program 22, leaving other portions or aspects of host program 22 un-compiled in the form of kernels 24. These kernels 24 therefore represent functions or other portions of host program 22 that have not yet been compiled. As a result of not being compiled, kernels 24 are defined within host program 22 using a high-level programming language, i.e., the C99 programming language in the context of OpenCL.

To illustrate the benefits of JIT compilation, consider the emerging mobile device market, where there are any number of different mobile devices, such as computing device 12, that may include various different types of CPUs, GPUs and other types of processing units. Moreover, in this mobile device market, new mobile devices are introduced nearly every day that feature different, often more advanced, CPUs, GPUs and other types of processing units. These more advanced CPUs, GPUs and other types of processing units may be adapted in certain ways to more efficiently execute OpenCL host programs including their kernels. If OpenCL featured only pre-compilation, developers of OpenCL host programs would have to continually recompile these host programs for each mobile device and then distribute these mobile device-specific host programs to each of the corresponding mobile devices. Yet, the mobile device market is not adapted to such a form of direct distribution. Commonly, so-called "app markets" are being provided where users of mobile devices may download so-called "apps" of which some may be OpenCL host programs similar to host program 22. These app markets do not generally provide for this form of direct distribution due to the complexity of implementing such a system. Instead, OpenCL provides for JIT compilation so that the mobile devices themselves may compile certain aspects of these host programs in a manner that makes best use of these devices' underlying processing unit hardware. This form of JIT compilation thereby makes development of host programs much easier in that the host program need not be separately compiled and then maintained for the different iterations and combinations of mobile device hardware.

In executing host program 22 in this JIT compilation framework, control unit 14 identifies kernels 24 and forwards these kernels 24 to runtime module 26. Runtime module 26 represents software that is executed by control unit 14 to manage JIT compilation and other real-time or near-real-time aspects of executing host program 22. Runtime module 26 may forward kernels 24 to compiler 28. Compiler 28 represents a software module that compiles or otherwise translates high-level code written in a high-level programming language into lower-level code written in a lower-level programming language. In this instance, kernels 24 are written in a high-level programming language referred to as C99 and compiler 28 translates this C99 to a lower-level code that is generally referred to as intermediate representation (IR) code. This IR code is not often directly executed by one of compute devices 16 and generally requires further compilation to reduce the IR code to a low-level assembly or machine programming language. IR code is often produced to enable optimization of the code to reduce its size or otherwise enhance execution of the resulting code. Generally, compiler 28 outputs IR code that requires further compilation when the one of compute devices 16 that is to execute this code represents a GPU. In instances where the one of compute devices 16 that is to execute the resulting code is a CPU, compiler 28 may generate low-level code written in a machine or assembly programming language such that this resulting low-level code can be directly executed by the CPU.

In this instance, compiler 28 may generally represent a compiler/linker/optimizer. That is, the term "compiler" as used in this disclosure may refer to a compiler that has been integrated with a linker software module and a post-link optimizer software module to perform all operations necessary to generate a destination file. Compiler 28 therefore may include a translator or compiler that translates user-defined high-level code into lower-level object code. The linker software module of compiler 28 represents a module that copies or otherwise links the object code output by the translator and object code of libraries 30 into a destination file 32, which may store either machine or assembly code or the IR code discussed above.

While referred to as destination file 32, use of the term "file" may commonly denote that this destination file is stored to a file of a storage device, although the techniques should not be limited in this respect. Destination file 32 generally refers to any collection of related data, which may be stored to a memory (and, thus, may not technically be conventionally considered as a file) or a storage device (and, thus, may technically be conventionally considered as a file). For this reason, destination file 32 may be referred to herein as "destination data" and the terms "destination file" and "destination data" may be used interchangeably to refer to this collection of related data.

Libraries 30 may represent a repository of common functions that can be referenced or invoked by any host program, including host program 22. Libraries 30 permit software developers to reference these common functions to provide some functionality without having to develop this functionality themselves for each host program or application they develop. This linker or linker software module may therefore represent a module that actually copies the invoked functions of libraries 30 into destination file 32.

The optimizer aspect of compiler 28 then optimizes the code stored to destination file 32 to, for example, reduce the size of destination file 32 and/or improve the subsequent execution of this code stored to destination file 32 or a derivative thereof (such as in instances where subsequent compilation is performed to further compile IR code into assembly or machine code). While described as an integrated compiler/linker/optimizer, compiler 28 need not necessarily be implemented in this manner. Thus, while described with respect to such an integrated compiler 28, the translator or compiler, linker and optimizer aspects of compiler 28 may be implemented as separate modules. The techniques should not therefore be limited to the exemplary implementation shown in the example of FIG. 1.

Compiler 28 outputs destination file 32 to runtime module 26, which proceeds to forward destination file 32 to one of compute devices 16. Host program 22 may identify the one of compute devices 16 that should execute destination file 32 and pass an identifier to runtime module 26 that identifies the identified one of compute devices 16 that is to execute destination file 32. Although described as executing destination file 32, such execution of destination file 32 may involve additional compilation to translate IR code to machine or assembly code that is capable of being executed by a particular one of compute devices 16. In this sense, destination file 32 may not be executed but a derivative thereof. For example, destination file 32 may undergo further compilation to further reduce destination file 32 to a lower level programming language, such as common machine or assembly programming languages, and this derivative of destination file 32 may be executed. Reference to execution of destination file 32 in this disclosure therefore refers to execution of destination file 32 or a derivative thereof.

In response to receiving destination file 32, the identified one of compute devices 16 executes destination file 32, returning the result of executing destination file 32 to runtime module 26 in the form of results 34. Runtime module 26 then passes results 34 back to host program 22, which uses results 34 in any number of ways. For example, host program 22 may present results 34 to a user of computing device 12 via a user interface. Alternatively, host program 22 may utilize results 34 in computing a total, sum, or other mathematical value. In any event, host program 22 receives and utilizes results 34.

Of particular importance to many users of mobile computing devices, which computing device 12 is assumed to represent for purposes of illustration, is the duration during which the mobile device may be used before the battery powering the mobile device requires recharging. This so-called "battery life" is generally inversely proportional to the complexity of the operations performed by control unit 14. To illustrate, a complex operation may involve executing a large number of instructions to complete the operation, where execution of each instruction may consume some amount of power, thereby decreasing battery life. Developers of mobile devices, such as computing device 12, are increasingly attempting to lengthen battery life despite the increasingly more complex operations that users of mobile devices expect their mobile devices to perform. These mobile device developers are increasingly optimizing mobile devices to reduce battery consumption by way of employing low voltage processing units, low voltage memories and other hardware advances to accommodate reduced power consumption.

In terms of software, however, many software developers are more concerned with functionality and convenience rather than the power efficiency of their programs. JIT compilation is one such example where software developers prefer convenience over power efficiency considering that JIT compilation allows developers to accommodate many different types of mobile device hardware profiles but involves significant power consumption to compile kernels 24 in near-real-time or real-time. One aspect of JIT compilation that consumes significant amount of power is the linking of one or more of libraries 30 into destination file 32 and the subsequent optimization. Typically, memory copies consume significant amounts of power. In the context of linking one or more of libraries 30, conventional linkers link or copy in their entirety one or more of libraries 30, even though kernels 24 may only invoke one or more of the potentially hundreds or thousands of functions specified in each of these one or more linked libraries 30, where each of libraries 30 may be generally referred to as a source file in this disclosure, considering that these are a source of functions accessible by user-defined code. This sparse utilization of library functions by kernels 24 results in a copying or linking of a large number of unused functions, which consumes significant amounts of battery power in the form of the library copy.

Copying these one or more libraries 30 in their entirety also impacts the resulting size of destination file 32. Developers of compilers, however, have addressed this size issue by providing for post-link optimization. The above noted optimizer of compiler 28 may optimize the code stored to destination file 32 by performing a form of dead code elimination, which eliminates those library functions and other user-defined functions that are copied into destination file 32 but that are not invoked or otherwise referenced by the active or executable portions of the code stored to destination file 32. That is, the optimizer implements dead code elimination to identify those functions that are not invoked or reachable by the active portions of the code stored to destination file 32 and then deletes the identified functions from destination file 32.

This process of linking libraries 30 in their entirety and subsequent optimization through dead code elimination was first introduced in the context of desktop computing where power was less of a concern and then carried over to the mobile computing context without much thought of the resulting power inefficiencies due to the limited amount of JIT compilation or any compilation in the mobile device context. Yet, the rise of programming frameworks, such as OpenCL, that frequently employ JIT compilation to compile kernels 24, the process of linking libraries 30 in their entirety and subsequent dead code elimination, has resulted in an increasing consumption of power that is negatively impacting battery life.

In accordance with the techniques described in this disclosure, compiler 28 performs a form of inline dead code elimination during linking, that may greatly reduce memory copies, by linking only those functions that are reachable into destination file 32. By reducing the number of memory copies, the techniques may significantly reduce the power consumed when performing linking during JIT compilation. Again, compilation in this disclosure may be used to refer to translating (or compilation), linking, and optimization, although these may be technically considered as separate operations. Moreover, subsequent post-link dead code elimination may be performed more efficiently in that it may only need to evaluate those functions that are included in destination file 32 after the inline form of dead code elimination performed by the linker, in accordance with the techniques described in this disclosure. In this way, the techniques may avoid costly (in terms of power consumption) memory copies of sparsely utilized libraries 30 and facilitate the application of post-link dead code elimination. While the techniques may eliminate post-link dead code elimination in some instances, compiler 28 may still perform post-link dead code elimination as the techniques s may only be applied to the linkage of functions from libraries 30, whereas post-link dead code elimination evaluates both user-defined functions and library functions.

To illustrate, compiler 28 may receive one of kernels 24 and translate the high-level code that defines this one of kernels 24 into lower-level object code. Compiler 28 then invokes a linker software module (which is not shown in the example of FIG. 1 for ease of illustration purposes) that has been adapted or otherwise configured to perform the techniques described in this disclosure. This linker receives this lower-level object code and copies the lower-level object code generated from translating kernel 24 to destination file 32. It is assumed that this lower-level object code represents user-defined code having a reference to at least one of the functions of one of libraries 30.

After copying the lower-level object code generated through translation of one of kernels 24 to destination file 32, the linker evaluates destination file 32 to determine whether the at least one of the functions of one of libraries 30 referenced in the lower-level object code is reachable or, in other words, may be executed during subsequent execution of the destination file. In some instances, the linker may encounter function pointers that are capable of referencing or otherwise pointing to one of many functions stored to a table or other data structure. The linker may evaluate this function pointer and determine that all of the functions stored to the table may be executed during subsequent execution of the destination file. In any event, based on the determination that the one of the functions of one of libraries 32 defined in the user-defined code will be executed, the linker selectively copies the one of the functions of the corresponding one of libraries 30 to destination file 32 prior to the execution of this destination file, without copying any other of the functions of this one of libraries 30 that were not referenced by the lower-level object code.

The linker then repeats this process with respect to updated destination file 32, which has been updated in the sense that the linker copied the determined one of the functions of the one of libraries 32 to destination file 32. That is, the linker once again evaluates destination file 32 to determine whether the object code stored to destination file 32 references at least one of the functions of one of libraries 30 that has not yet been linked into destination file 32. Upon determining that the object code of destination file 32 references at least one of the functions of one of libraries 30 that has not been linked into destination file 32, the linker then determines whether this one of the functions of one of libraries 30 will be executed during subsequent execution of the destination file. If the linker determines this function is not reachable, the linker determines that it need not link in this one of the functions of the one of libraries 30. However, if the linker determines that this function is reachable, the linker links this additional one of functions of the one of libraries 30 into destination file 32. The linker of compiler 28 continues in this manner until the linker evaluates destination file 32 and determines that there are no additional functions of libraries 30 that need be linked into destination file 32 that have not already been linked into destination file 32.

The linker outputs this destination file to the optimizer of compiler 32, which may proceed to perform post-link dead code elimination, in addition to other post-link optimizations. This post-link dead code elimination, as noted above, removes so-called "dead code" or code that will not be executed during subsequent execution of destination file 32. The optimizer performs this dead code elimination with respect to both the user-defined code and the linked in library functions and removes any code that is not reachable. This post-link form of dead code elimination can be differentiated from the inline form of dead code elimination performed by the linker in accordance with the techniques described herein in two ways. First, the post-link form of dead code elimination may evaluate both the user defined object code and the linked library functions to eliminate dead code, while the inline form of dead code elimination only evaluates library functions to eliminate extraneous linking of library functions that are not referenced by the user-defined object code. Second, the post-link form of dead code elimination occurs after linking while the inline form of dead code elimination occurs during linking of the object code into destination file 32.

After completing the post-link form of dead code elimination and any other code optimization procedures, the optimizer of compiler 28 outputs destination file 32 to runtime module 26. As noted above, runtime module 26 forwards destination file 32 to one of compute devices 16A, which proceeds to execute destination file 32 or a derivative thereof and return results 34. Runtime module 26 receives these results 34 and forwards them to host program 22, which continues to execute in view of results 34 in the manner described above.

In this way, computing device 12 performs a form of inline dead code elimination during object code linking in accordance with the techniques described in this disclosure. As noted above, these techniques may greatly reduce memory copies by linking only those functions that are reachable into destination file 32. By reducing the number of memory copies, the techniques may significantly reduce the power consumed when performing linking during JIT compilation. Moreover, the techniques may facilitate subsequent post-link dead code elimination in that the this post-link dead code elimination may only need to evaluate those functions that are included in destination file 32, which may have been greatly reduced in number due to application of the inline form of dead code elimination performed in accordance with the techniques described in this disclosure. As a result, the techniques may avoid costly (in terms of power consumption) memory copies of sparsely utilized libraries 30 and facilitate the application of post-link dead code elimination.

While described in this disclosure with respect to OpenCL, the techniques may be performed with respect to any other type of programming frameworks that allows for real-time, near real-time or just-in-time (JIT) compilation of kernels, functions, or code generally. Examples of these other types of programming frameworks includes program frameworks referred to as "compute unified device architecture" or "CUDA" and "DirectCompute." Moreover, while these example programming frameworks provide for execution of applications across different types of compute units, the techniques may be implemented with respect to programming frameworks that do not permit such cross-compute unit execution. Moreover, the techniques described in this disclosure may be applied to compilers of any type, not just those that provide for real-time, near real-time or JIT compilation so as to improve compile times by reducing the amount of data linked into the destination data.

Figure 2:
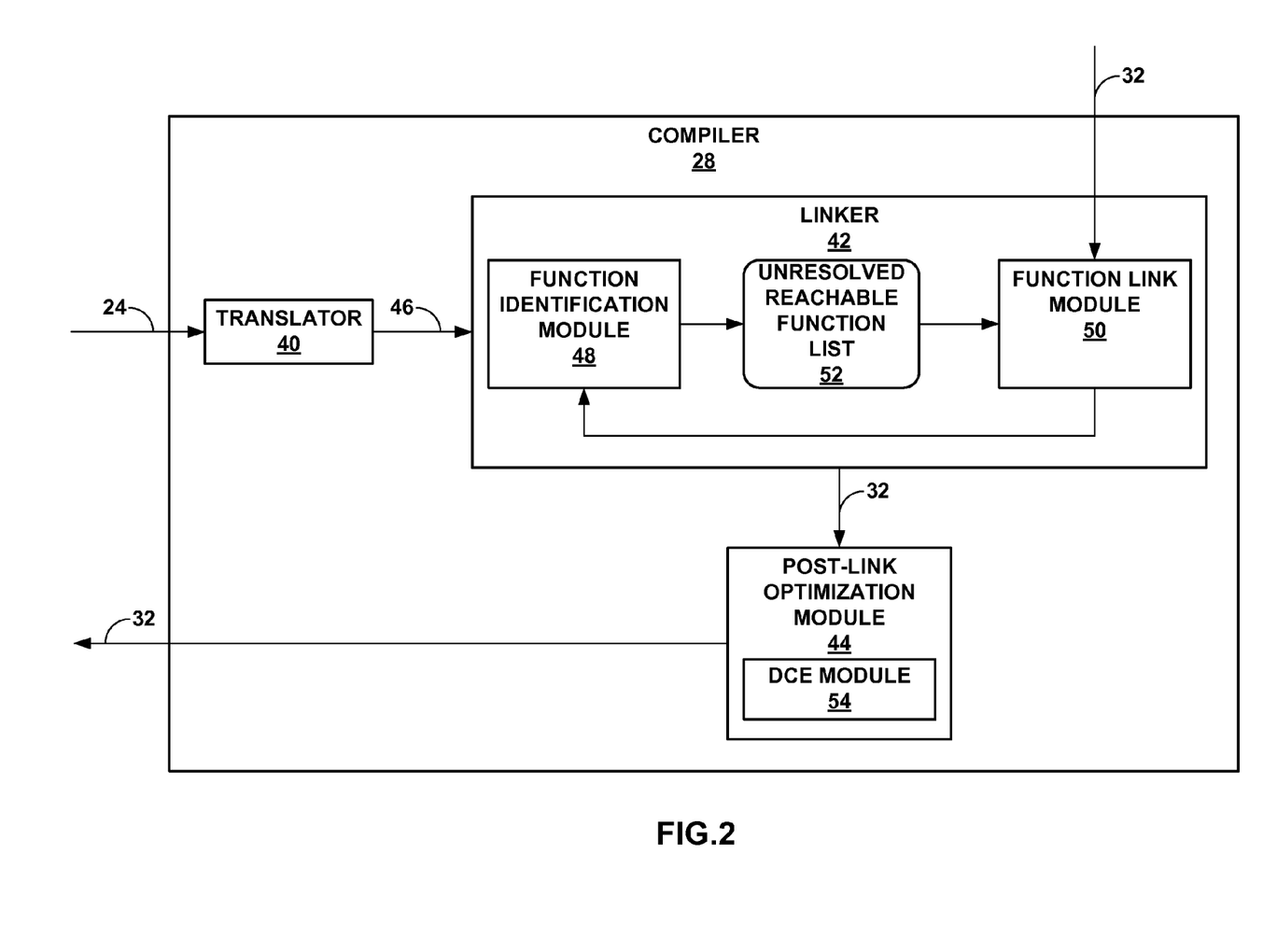
FIG. 2 is a block diagram illustrating a compiler shown in the example of FIG. 1 in more detail.

FIG. 2 is a block diagram illustrating compiler 28 of FIG. 1 in more detail. In the example of FIG. 2, compiler 28 includes a translator 40, a linker 42 and a post-link optimization module 44. Translator 40 represents a software module that reduces user-defined code, which is represented by kernels 24 in this example, coded or written in a high-level programming language, to object code that complies with a lower-level programming language, which may include IR code. Translator 40 outputs this user-defined object code 46 to linker 42.

Linker 42 includes a function identification module 48 and a function link module 50. Function identification module 48 represents a module that performs the above noted evaluation of user-defined object code 46 to determine whether the user-defined object code 46 includes a reference to the at least one function defined within one of libraries 30. Function link module 50 represents a module that links functions identified by function identification module 48 into destination file 32. In response to receiving user-defined object code 46, linker 42 invokes function identification module 48, which proceeds to evaluate user-defined object code 46 to determine whether this object code includes a reference to at least one function defined within one of libraries 30. It is assumed for purposes of illustration that user-defined object code 46 includes a reference to at least one function defined within one of libraries 30.

Typically, function identification module 48 performs this evaluation of user-defined object code 46 by first identifying all symbols in this code 46 and then searching for the definition of these symbols first in object code 46 and then in those of libraries 30 that have been identified by function identification module 48 as being referenced or incorporated by object code 46. The term symbol in this context refers to a combination of characters that identify a variable, function, pointer or other type of object. When defining kernels 24, the software developer typically indicates those of libraries 30 that are incorporated into each of kernels 24. Linker 42 analyzes object code 46 to determine the one or more of libraries 30 that have been incorporated into object code 46. After failing to find a definition of any unresolved symbol in object code 46, function identification module 48 determines that the unresolved symbol is defined within one of the identified set of libraries 30.

In some instances, two or more libraries may be linked by user-defined object code 46. In these instances, linker 42 may determine which of the linked libraries is largest and most sparsely utilized. Linker 42 determine a size of each these two or more linked libraries and link the one of these two or more libraries having the largest size (in terms of bytes) last under the assumption that the largest one of the two or more libraries is more than likely sparsely utilized by user-defined object code 46. Alternatively, linker 42 may perform a more thorough analysis with respect to the utilization of the two or more libraries and determine a percent utilization for each of the two or more libraries, selecting to link the one of the two or more libraries with the lowest determined percent utilization. Those of the two or more libraries determined to be less sparsely utilized may be linked in their entirety, while linker 42 implements the in-line DCE techniques described in this disclosure to link the one of the two or more libraries determined to be most sparsely utilized. This aspect of the techniques may be employed when linking of user-defined libraries is not allowed, such as in version 1.1 and below of OpenCL, where linker 42 may appropriately determine what may be referred to as a "final link" (which refers to the one of the libraries that is linked last).

In response to determining that this unresolved symbol is defined within one of the identified set of libraries 30, function identification module 48 then determines whether this unresolved symbol refers to a library function that will be reached or executed during subsequent execution of the destination file or a derivative thereof. In some instances, depending on certain branch and other characteristics of the data and state of execution of host program 22, function identification module 48 may be able to determine that one branch or conditional instruction will result in a function that cannot be reached (or, in other words, a function that will be skipped during subsequent execution). In some instances, function identification module 48 may encounter a function pointer that points to a table of functions, where function identification module 48 cannot determine whether any one of the functions stored to the table will in fact be reached given the dynamic nature of function pointers. Function identification module 48 may, in this function pointer instance, indicate that all of the functions stored to the table of functions can be reached. Generally, function identification module 48 indicates that a function can be reached during subsequent execution if there is any chance that this function might be reached. In this respect, function identification module 48 is inclusive and only excludes functions for which it can positively determine that there is no chance the identified function will be executed. Function identification module 48 stores the symbol for each of the functions that it identified as unresolved and reachable to reachable function list or table 52. After storing the symbols representative of these unresolved and reachable functions to unresolved reachable function list 52, linker 42 invokes function link module 50.

Once invoked, function link module 50 accesses unresolved reachable function list 52 and parses the symbols from this list 52. Function link module 50 also receives from function identification module 48 data identifying those of libraries 30 that were incorporated into kernel 24. Function link module 50 then reads only the declaration of functions included within each of these incorporated set of libraries 30 without reading this set of libraries 30 in their entirety. Function link module 50 attempts to resolve the unresolved symbol by determining whether the symbol is defined within these function declarations. Assuming that each of the functions stored to list 52 are properly defined within the function declarations of the incorporated set of libraries 30 (otherwise, linking fails and an error is returned), function link module 50 resolves each of these symbols and locates, based on the appropriate one of the function declarations associated with the incorporate set of libraries 30, each of the referenced functions in their respective one of libraries 30. Function link module 50 then copies this functions into destination file 32.

After linking in these functions to destination file 32, linker 42 then performs another iteration of these techniques described above with respect to this updated destination file 32. That is, linker 42 invokes function identification module 48 to once again identify those symbols that correspond to a function and that are unresolved and reachable and store these symbols to unresolved reachable function list 52. Linker 42 also invokes function link module 50 to once again link in any of the functions associated with the symbols stored to unresolved reachable function list 52. This process continues until function identification module 48 analyzes updated destination file 32 in its entirety and does not identify any symbol that has not been resolved. In response to this empty unresolved reachable function list 52, linker 42 outputs destination file 32 to post-link optimization module 44.

Post-link optimization module 44 receives destination file 32 and invokes dead code elimination (DCE) module 54 ("DCE module 54"), which performs dead code elimination with respect to destination file 32 in the manner described above. This post-link dead code elimination performed by DCE module 54 may be necessary to remove any unused or unreachable user-defined object code. To illustrate, software developers commonly provide a set of debug or other functions or software instructions used to test or otherwise debug their user-defined code. These functions or software instructions are commonly enabled when a specific constant global variable is set to a particular value but disabled when this global variable is set to a different value. DCE module 54 may remove these debug functions or software instructions from the user defined object code when the constant global variable is set to the value that disables these debug software functions or instructions, as these debug software functions or instructions would be considered as unreachable. The inline form of dead code elimination described in this disclosure may not remove these functions but only those library functions determined to be unreachable. Post-link optimization module 44 may perform other optimizations, including integrity or other checks to ensure proper memory management, proper code definitions and the like, as well as optimization that improve the subsequent execution of destination file 32 or a derivative thereof. Once optimization is complete, post-link optimization module 44 outputs destination file 32 to runtime module 26, which coordinates the execution of this destination file 32 or the derivative thereof, as described above.

Figure 3:
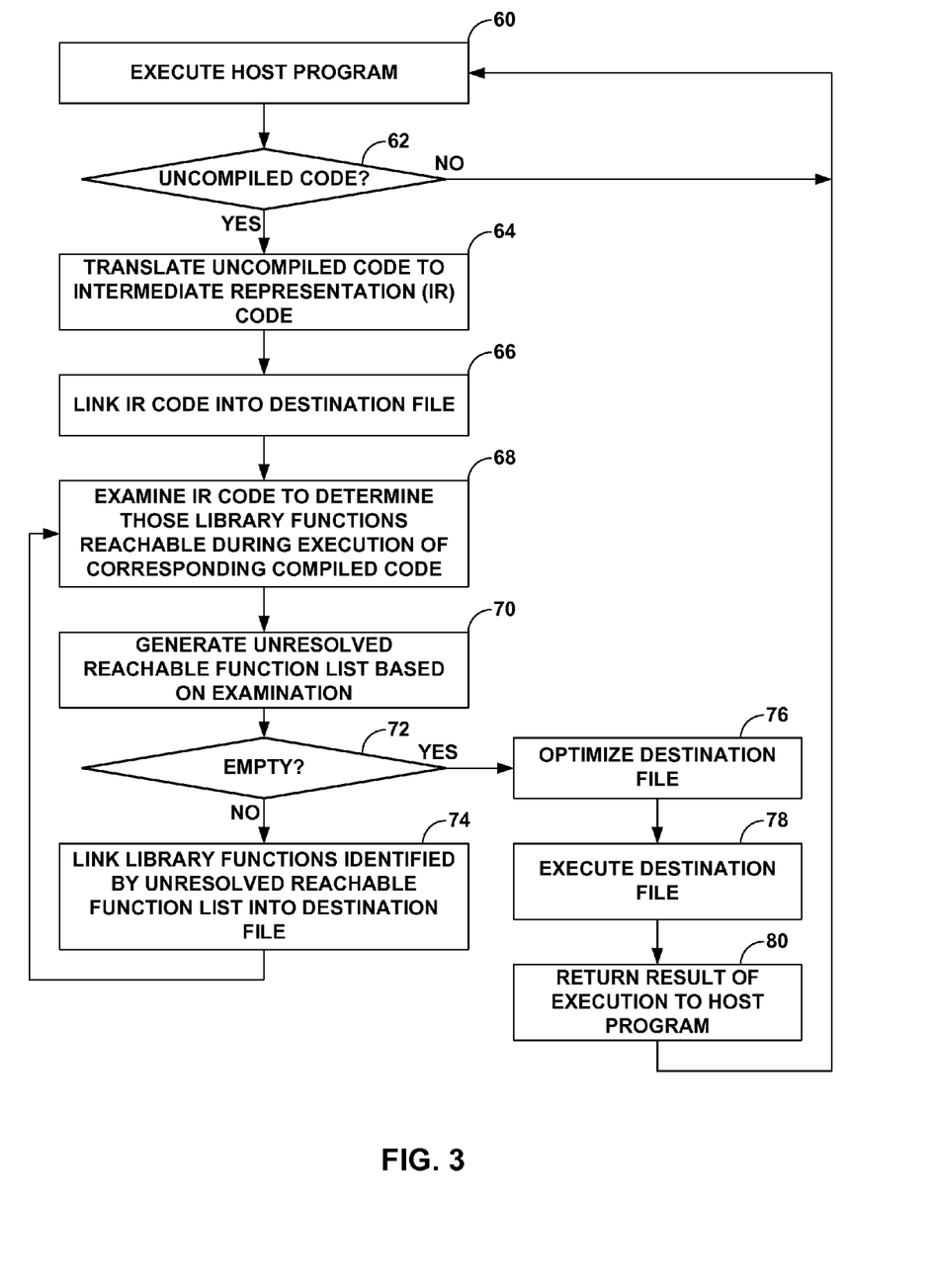
FIG. 3 is a flowchart illustrating exemplary operation of a computing device in implementing the inline function linking techniques described in this disclosure.

FIG. 3 is a flowchart illustrating exemplary operation of a computing device, such as computing device 10 shown in the example of FIG. 1, in implementing the inline function linking techniques described in this disclosure. Initially, a control unit 14 of computing device 12 executes host program 22 (60). Typically, a user or other operator of computing device 12 interfaces with a user interface (not shown in the example of FIG. 1 for ease of illustration purposes) to initiate the execution of host program 22 by control unit 14. Alternatively, an operating system or other software module (again, not shown in the example of FIG. 1 for ease of illustration purposes) may automatically (i.e., without direct user input) invoke host program 22 such that control unit 14 executed host program 22.

In any event, control unit 14 may, when executing host program 22, encounter un-compiled code, which in this example is referred to as kernels 24 (62). Until these so-called kernels 24 are encountered ("NO" 62), control unit 14 continues to execute host program 60 (60). Upon encountering kernels 24 or other types of un-compiled code ("YES" 62), host program 22 invokes runtime module 26. Once invoked, host program 22 may forward kernel 24 to runtime module 26, which manages the near-real-time, real-time or runtime compilation of kernel 24. Runtime module 26, upon receiving kernel 24, invokes compiler 28 and forwards kernel 24 to compiler 28 so that compiler 28 can compile kernel 24 to generate destination file 32.

Although described as involving runtime module 26, the techniques may be implemented in such a manner that runtime module 26 is not required or bypassed. In these instances, host program 22 may invoke compiler 28 directly and then forward kernels 24 to compiler 28 without involving runtime module 26. The techniques should not therefore be limited in this respect to require or otherwise utilize a runtime module, such as runtime module 26.

Compiler 28 receives kernel 24. In particular, referring to FIG. 2, translator 40 receives kernel 24 and translates kernel 24 to intermediate representation (IR) code 46 in the manner described above (64). Translator 40 forwards IR code 46 to linker 42. Linker 42 receives IR code 46 and links or, in other words, copies IR code 46 into destination file 32 (66). Linker 42 then invokes function identification module 48 after linking IR code 46 into destination file 32. Function identification module 48 examines IR code 46, as linked into destination file 32, to determine those library functions reachable during execution of the corresponding compiled code, as described above (68).

This evaluation may involve analyzing symbols (which generally represent function invocations and variables) included within IR code 46 and attempting first to resolve the symbols internally within the IR code or without reference to any other file, such as libraries 30. Often, a programmer or software developer will define their own functions and include these functions in kernel 24, such that a reference to this function or symbol can be resolved internally in that the function definition that corresponds to the referenced function can be located within the same file or group of files (i.e., kernel 24 in this example) as that in which references this function. If these symbols cannot be resolved internally to destination file 32, function identification module 48 next determines whether these functions are reachable.

In some instances, some functions referenced by kernel 24 may not be reachable or otherwise required for proper execution of the corresponding compiled code, such as functions relied on for debugging or other purposes unrelated to consumer execution of host program 22 or other functions that are not called or executed by host program 22. Function identification module 48 eliminates these so-called "unreachable" functions from further evaluation. Function identification module 48 next determines a set of one or more of libraries 30 that have been identified by kernel 24 as required to compile kernel 24. Function identification module 48 then retrieves only enough information from each of these identified ones of libraries 30 to determine whether these ones of libraries 30 include the unresolved, but reachable, symbols (which may represent an invocation of a reachable function of one of these libraries). Upon identifying one of the set of the incorporated ones of libraries 30 that includes this function, function identification module 48 stores the location of this function to unresolved reachable function list 52 (which is specified by the information retrieved from the ones of libraries 30) along with the symbol or function and the location of this unresolved symbol in destination file 32. In this way, function identification module 48 generates unresolved reachable function list 52 based on the examination of destination file 32 (70).

After all of the internally unresolved symbols have been resolved with respect to the identified set of one or more of libraries 30 and the above noted information is stored for each of these unresolved, but reachable, symbols to unresolved reachable function list 52, linker 42 invokes function link module 50. Function link module 50 retrieves unresolved reachable function list 52 and determines if list 52 is empty or otherwise does not specify any unresolved but reachable external functions (72). If function link module 50 determines that unresolved reachable function list 52 is not empty, function link module 50 links (which is another way to refer to copying) those functions from library 30 identified by unresolved reachable function list 52 into destination file 32 in the manner described above (74). If function link module 50 determines that unresolved reachable function list 52 is empty ("YES" 72), function link module 50 returns control to linker 42, which in turn invokes post-link optimization module 44.

Figure 4:
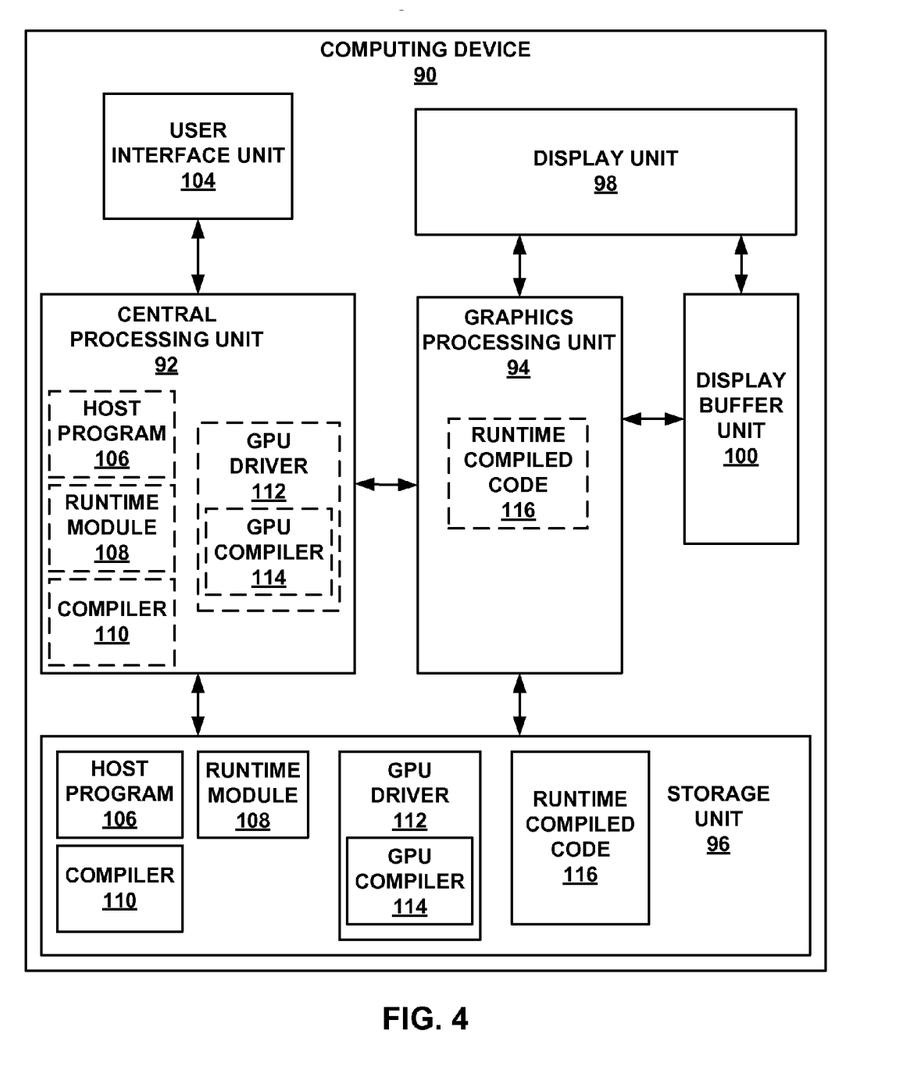
FIG. 4 is a block diagram illustrating another computing device that may implement the techniques described in this disclosure.

Post-link optimization module 44 may further optimize destination file 32 for subsequent execution (76). In some instances, post-link optimization module 44 invokes DCE module 54, which performs conventional dead code elimination. Post-link optimization module 44 then outputs a post-link destination file 32. In some instances, this destination file 32 is output to runtime module 26, which coordinates further runtime or near-runtime processing, such as additional compilation to generate a derivative destination file or an executable file. Runtime module 26 may forward destination file 32 or a derivative thereof to one of compute devices 16, where the one of compute devices 16 selected to execute this destination file 32 or a derivative thereof may be specified by the user prior to runtime or otherwise determined during runtime. In any event, this one of compute devices 16 executes destination file 32 or the derivative thereof (78). This one of compute devices 16 then returns result 34 to host program 22 via runtime module 26, as described above (80). Host program 22 may continue to execute in this manner until a user ends or otherwise stops execution of host program 22 or host program 22 terminates (60-80). FIG. 4 is a block diagram illustrating another computing device 90 that may implement the techniques described in this disclosure. In the example of FIG. 4, computing device 90 represents a mobile device, such as any combination of a cellular phone (including so-called "smart phones"), a laptop computer, and a so-called "netbook," or a personal digital assistant (PDA), a geographical positioning system (GPS) unit, an embedded system, a portable media systems, or any other type of computing device that typically implement or support OpenCL in accordance with the OpenCL specification.

In the example of FIG. 4, computing device 90 includes a central processing unit (CPU) 92, a graphics processing unit (GPU) 94, a storage unit 96, a display unit 98, a display buffer unit 100, and a user interface unit 104. In one example, control unit 14 shown in the example of FIG. 1 may comprise units 92-104. Although CPU 92 and GPU 94 are illustrated as separate units in the example of FIG. 4, CPU 92 and GPU 94 may be integrated into a single unit, such as in the case when the GPU is integrated into the CPU. Each of CPU 92 and GPU 94 may represent one or more processors that are capable of executing machine or low-level (LL) instructions. GPU 94 represents one or more dedicated processors for performing graphical operations. In some instances, GPU 94 may provide three levels of parallelism. GPU 94 may provide a first level of parallelism in the form of parallel processing of four color channels. GPU 94 may provide a second level of parallelism in the form of hardware thread interleaving to process pixels and a second level of parallelism in the form of dynamic software thread interleaving.

Storage unit 96 may comprise one or more computer-readable storage media. Examples of storage unit 96 include, but are not limited to, non-transitory computer-readable media, such as a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by a computer or a processor. In some example implementations, storage device 76 may include instructions that cause CPU 92 and/or GPU 94 to perform the techniques set forth in this disclosure. Storage unit 96 may, in some examples, be considered as a non-transitory storage medium. The term "non-transitory" may indicate that the storage medium is not embodied in a carrier wave or a propagated signal. However, the term "non-transitory" should not be interpreted to mean that storage unit 96 is non-movable. As one example, storage unit 96 may be removed from computing device 90, and moved to another device. As another example, a storage unit, substantially similar to storage unit 96, may be inserted into computing device 90. In certain examples, a non-transitory storage medium may store data that can, over time, change (e.g., in RAM).

Display unit 98 represents a unit capable of displaying video data, images, text or any other type of data for consumption by a viewer. Display unit 98 may include a liquid-crystal display (LCD), a light emitting diode (LED) display, an organic LED (OLED), an active-matrix OLED (AMOLED) display, or the like. Display buffer unit 100 represents a memory or storage device dedicated to storing data for display unit 98. User interface unit 104 represents a unit with which a user may interact with or otherwise interface to communicate with other units of computing device 90, such as CPU 92. Examples of user interface unit 104 include, but are not limited to, a trackball, a mouse, a keyboard, and other types of input devices. User interface unit 104 may also be a touch screen and may be incorporated as a part of display unit 98.

Computing device 90 may include additional modules or units not shown in FIG. 4 for purposes of clarity. For example, computing device 90 may include a speaker and a microphone, neither of which are shown in FIG. 4, to effectuate telephonic communications in examples where computing device 90 is a mobile wireless telephone, or a speaker where computing device 90 is a media player. In some instances, user interface unit 104 and display unit 98 may be external to computing device 90 in examples where computing device 90 is a desktop computer or other device that is equipped to interface with an external user interface or display.

As illustrated in the example of FIG. 4, storage unit 96 stores host program 106, runtime module 108, compiler 110 and GPU driver 112. Host program 106 may be substantially similar to host program 22 described above by way of example with respect to FIGS. 1-3. Runtime module 108 may be substantially similar to runtime module 26 described above by way of example with respect to FIGS. 1-3. Compiler 110 may be substantially similar to compiler 28 described above by way of example with respect to FIGS. 1-3. GPU driver 112 represents an instructions that, when executed, cause CPU 92 to provide an interface by which to communicate with GPU 94. GPU driver 112 includes a GPU compiler 114 that enables runtime compilation of IR into a machine or other low level (LL) programming language supported by GPU 94.

CPU 92 may execute host program 106 (where such execution is generally shown in FIG. 4 as a dash-lined box that corresponds to those shown within storage unit 96) in the manner described above. Upon encountering the so-called "kernels" or embedded un-compiled code, host program 106 causes CPU 92 to execute, invoke or otherwise transfer control of execution to runtime module 108. Runtime module 108 then facilitates the compilation of this kernel by passing this kernel to compiler 110, which implements the techniques described in this disclosure to generate a destination file similar to destination file 32 described above. Compiler 110 passes this destination file back to runtime module 108, which either causes CPU 92 to execute this destination file or otherwise causes this destination file to undergo additional compilation.

In this example, it is assumed that the returned destination file is not an executable file but requires additional compilation. Runtime module 108 may determine whether any given destination file requires additional compilation depending on whether destination file is to be executed by GPU 94 or CPU 92. As noted above, compute devices 16 may each represent either a GPU or a CPU, to name one of many potential types of compute devices. In this example, each of CPU 92 or GPU 94 is abstracted as a different compute device. Runtime module 108 may determine, for each compute device, whether additional compilation of destination file is required prior to execution of the destination file by each of these compute devices.

In this instance, it is assumed that runtime module 108 determines that the returned destination file is to be executed by a compute device representing GPU 94 and that this compute device requires additional compilation. Runtime module 108 may be configured or, in some instances, may dynamically determine that, prior to execution of the destination file by the compute device representing GPU 94, the destination file requires further compilation by GPU compiler 114. Runtime module 108 may pass the destination file to GPU driver 112, which invokes GPU compiler 114 to further compile this destination file into runtime compiled code 116. GPU compiler 116 may store this runtime compiled code 116 to storage unit 116 until GPU 94 is available to execute runtime compiled code 116. At some point, GPU 94 executes runtime compiled code 116, generating a result, which is passed back to runtime module 108. Runtime module 108 may return the result to host program 106, which may utilize the result in further computations, calculations or operations. Computing device 90 may continue to execute in this manner until host program 106 has finished executing or terminated by a user or other event.

In some implementations, runtime module 108 may be provided as a separate driver, such as an OpenCL driver. This OpenCL driver may include a CPU driver comprising compiler 110. This OpenCL driver may also include GPU driver 112, which, as shown in the example of FIG. 4, includes GPU compiler 114. In some instances, the CPU driver and GPU driver 112 are integrated into a single CPU/GPU driver, where compiler 110 and GPU compiler 114 may also be integrated into a single compiler. Moreover, while described above with respect to this OpenCL framework, the techniques may be implemented with respect to any type of compiler, including those executing on desktop computers or other non-mobile devices. Outside of the OpenCL framework, a runtime component is typically not provided when users initiate compilation themselves. The techniques therefore should not be limited in this respect to the example of FIG. 4.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for copying data from two source files to a destination file, the method comprising:

copying a first one of the two source files to the destination file with a processor, wherein the first one of the two source files includes a reference to a portion of a second one of the two source files, and wherein the second one of the two source files comprises a library of functions provided for copying the entire library of functions into the destination file only prior to execution of the destination file;

without executing any portion of the destination file, evaluating the destination file with the processor to determine whether the portion of the second one of the two source files referenced in the first one of the two source files is used by the destination file; and based on the determination that the portion of the second one of the two source files referenced in the first one of the two source files is used by the destination file and rather than copying the entire second one of the two source files, selectively copying the portion of the second one of the two source files to the destination file with the processor to generate an updated destination file only prior to execution of the destination file.

2. The method of claim 1, wherein selectively copying the portion of the second one of the two source files to the destination file comprises copying only the portion of the second one of the two source files to the destination file to generate the updated destination file without copying those portions of the second one of the two source files not currently determined to be used by the destination file.

3. The method of claim 2, further comprising:
   evaluating the updated destination file to determine whether the portion of the second one of the two source files selectively copied into the destination file to generate the updated destination file includes an additional reference to a portion of the two source files not yet copied into the updated destination file that is different from the portion of the second one of the two source files previously copied into the destination file to generate the updated destination file; and
   in response to determining that the portion of the second one of the two source files selectively copied into the destination file to generate the updated destination file includes the additional reference to the different portion of any of the two source files not yet copied into the updated destination file, copying the different portion of any of the two source files into the updated destination file.

4. The method of claim 2, further comprising executing a host program with the processor that includes the first one of the two source files,
   wherein the first one of the two source files comprises an embedded un-compiled user-defined code,
   wherein the reference to the portion of the second one of two source files comprises a reference to a function of the library of functions, and
   wherein the destination file comprises compiled code.

5. The method of claim 4, further comprising, during execution of the host program, selectively copying at least one function of the library of functions to the destination file prior to performing post link optimization on the destination file.

6. The method of claim 4, further comprising determining whether the processor has a potential to execute the function of the library of functions referenced by the compiled code when executing the compiled code.

7. The method of claim 4,
   wherein the compiled code comprises Intermediate Representation (IR) code, and
   wherein the method further comprises:
   compiling the IR code to generate low-level code that conforms to a low-level programming language supported by a graphics processing unit (GPU);
   executing the low-level code with the GPU to generate a result;
   returning the result to the host program; and
   processing the result with the host program.

8. The method of claim 4,
   wherein the compiled code comprises low-level code that conforms to a low-level programming language supported by the processor, and
   wherein the method further comprises:
   executing the low-level code with the processor to generate a result;
   returning the result to the host program; and
   processing the result with the host program.

9. The method of claim 4,
   wherein the host program further comprises additional compiled code that conforms to an Open Computing Language (OpenCL) framework,
   wherein the embedded un-compiled user-defined code also conforms to the OpenCL framework, and
   wherein the method further comprises:
   executing the additional compiled code of the host program with the processor; and
   executing a compiler concurrently with the execution of the additional compiled code of the host program to compile the embedded un-compiled user-defined code so as to generate the compiled code.

10. The method of claim 9, further comprising:
    determining whether the compiled code is to be executed by the processor or a graphics processing unit (GPU);
    based on the determination that the compiled code is to be executed by the processor, outputting the compiled code to the processor;
    executing the compiled code with the processor to produce one or more results;
    returning the one or more results to the host program; and
    processing the one or more results with the host program.

11. The method of claim 9, further comprising:
    determining whether the compiled code is to be executed by the processor or a graphics processing unit (GPU);
    based on the determination that the compiled code is to be executed by the GPU, compiling the compiled code to generate low-level code that conforms to a low-level programming language supported by the GPU;
    executing the low-level code with the GPU to generate a result;
    returning the result to the host program; and
    processing the result with the host program.

12. An apparatus for copying data from two source files to a destination file, the apparatus comprising:
    means for copying a first one of the two source files to the destination file, wherein the first one of the two source files includes a reference to a portion of a second one of the two source files, and wherein the second one of the two source files comprises a library of functions provided for copying the entire library of functions into the destination file only prior to execution of the destination file;
    without executing any portion of the destination file, means for evaluating the destination file to determine whether the portion of the second one of the two source files referenced in the first one of the two source files is used by the destination file; and
    based on the determination that the portion of the second one of the two source files referenced in the first one of the two source files is used by the destination file and rather than copying the entire second one of the two source files, means for selectively copying the portion of the second one of the two source files to the destination file to generate an updated destination file only prior to execution of the destination file.

13. The apparatus of claim 12, further comprising means for copying only the portion of the second one of the two source files to the destination file to generate the updated destination file without copying those portions of the second one of the two source files not currently determined to be used by the destination file.

14. The apparatus of claim 13, further comprising:
    means for evaluating the updated destination file to determine whether the portion of the second one of the two source files selectively copied into the destination file to generate the updated destination file includes an additional reference to a portion of the two source files not yet copied into the updated destination file that is different from the portion of the second one of the two source files previously copied into the destination file to generate the updated destination file; and
    in response to determining that the portion of the second one of the two source files selectively copied into the destination file to generate the updated destination file includes the additional reference to the different portion of any of the two source files not yet copied into the updated destination file, means for copying the different portion of any of the two source files into the updated destination file.

15. The apparatus of claim 13, further comprising means for executing a host program that includes the first one of the two source files,
wherein the first one of the two source files comprises embedded un-compiled user-defined code,
wherein the reference to the portion of the second one of two source files comprises a reference to a function of the library of functions, and
wherein the destination file comprises compiled code.

16. The apparatus of claim 15, further comprising, during execution of the host program, means for selectively copying at least the function of the library of functions to the destination file prior to performing post link optimization on the destination file.

17. The apparatus of claim 15, further comprising means for determining whether a processor has a potential to execute the function of the library of functions referenced by the compiled code when executing the compiled code.

18. The apparatus of claim 15,
wherein the compiled code comprises Intermediate Representation (IR) code, and
wherein the apparatus further comprises:
means for compiling the IR code to generate low-level code that conforms to a low-level programming language supported by a graphics processing unit (GPU);
means for executing the low-level code with the GPU to generate a result;
means for returning the result to the host program; and
means for processing the result with the host program.

19. The apparatus of claim 15,
wherein the compiled code comprises low-level code that conforms to a low-level programming language, and
wherein the apparatus further comprises:
means for executing the low-level code to generate a result;
means for returning the result to the host program; and
means for processing the result with the host program.

20. The apparatus of claim 15,
wherein the host program further comprises additional compiled code that conforms to an Open Computing Language (OpenCL) framework,
wherein the embedded un-compiled user-defined code also conforms to the OpenCL framework, and
wherein the apparatus further comprises:
means for executing the additional compiled code of the host program; and
means for executing a compiler concurrently with the execution of the additional compiled code of the host program to compile the embedded un-compiled user-defined code so as to generate the compiled code.

21. The apparatus of claim 20, further comprising:
means for determining whether the compiled code is to be executed by a processor or a graphics processing unit (GPU);
based on the determination that the compiled code is to be executed by the processor, means for outputting the compiled code to the processor;
means for executing the compiled code with the processor to produce one or more results;
means for returning the one or more results to the host program; and
means for processing the one or more results with the host program.

22. The apparatus of claim 20, further comprising:
means for determining whether the compiled code is to be executed by a processor or a graphics processing unit (GPU);
based on the determination that the compiled code is to be executed by the GPU, means for compiling the compiled code to generate low-level code that conforms to a low-level programming language supported by the GPU;
means for executing the low-level code with GPU to generate a result;
means for returning the result to the host program; and
means for processing the result with the host program.

23. An apparatus for copying data from two source files to a destination file, the apparatus comprising:
a storage unit that stores the two source files and the destination file; and
one or more processors that:
copy a first one of the two source files to the destination file, wherein the first one of the two source files includes a reference to a portion of a second one of the two source files, and wherein the second one of the two source files comprises a library of functions provided for copying the entire library of functions into the destination file only prior to execution of the destination file,
without executing any portion of the destination file, evaluate the destination file to determine whether the portion of the second one of the two source files referenced in the first one of the two source files is used by the destination file, and
based on the determination that the portion of the second one of the two source files referenced in the first one of the two source files is used by the destination file and rather than copy the entire second one of the two source files, selectively copy the portion of the second one of the two source files to the destination file to generate an updated destination file only prior to execution of the destination file.

24. The apparatus of claim 23, further comprising a linker that copies only the portion of the second one of the two source files to the destination file to generate the updated destination file without copying those portions of the second one of the two source files not currently determined to be used by the destination file.

25. The apparatus of claim 24, wherein the linker evaluates the updated destination file to determine whether the portion of the second one of the two source files selectively copied into the destination file to generate the updated destination file includes an additional reference to a portion of the two source files not yet copied into the updated destination file that is different from the portion of the second one of the two source files previously copied into the destination file to generate the updated destination file; and in response to determining that the portion of the second one of the two source files selectively copied into the destination file to generate the updated destination file includes the additional reference to the different portion of any of the two source files not yet copied into the updated destination file, copies the different portion of any of the two source files into the updated destination file.

26. The apparatus of claim 24, wherein the one or more processors execute a host program that includes the first one of the two source files,
wherein the first one of the two source files comprises embedded un-compiled user-defined code, wherein the reference to the portion of the second one of two source files comprises a reference to a function of the library of functions, and wherein the destination file comprises compiled code.

27. The apparatus of claim 26, wherein the linker, during execution of the host program, selectively copies at least the function of the library of functions to the destination file prior to performing post link optimization on the destination file.

28. The apparatus of claim 26, wherein the linker determines whether a processor has a potential to execute the function of the library of functions referenced by the compiled code when executing the compiled code.

29. The apparatus of claim 26,
wherein the compiled code comprises Intermediate Representation (IR) code,
wherein the one or more processors include a graphics processing unit (GPU) and a compiler,
wherein the compiler compiles the IR code to generate low-level code that conforms to a low-level programming language supported by the GPU,
wherein the GPU executes the low-level code to generate a result and returns the result to the host program, and
wherein the one or more processors execute the host program to process the result.

30. The apparatus of claim 26,
wherein the compiled code comprises low-level code that conforms to a low-level programming language supported by a processor, and
wherein the one or more processors execute the low-level code to generate a result, return the result to the host program, and execute the host program to process the result.

31. The apparatus of claim 26,
wherein the host program further comprises additional compiled code that conforms to an Open Computing Language (OpenCL) framework,
wherein the embedded un-compiled user-defined code also conforms to the OpenCL framework, and
wherein the one or more processors execute the additional compiled code of the host program and execute a compiler concurrently with the execution of the additional compiled code of the host program to compile the embedded un-compiled user-defined code so as to generate the compiled code.

32. The apparatus of claim 31,
wherein the one or more processors comprise a central processing unit (CPU) and a graphics processing unit (GPU), and
wherein the CPU determines whether the compiled code is to be executed by the CPU or the GPU, based on the determination that the compiled code is to be executed by the CPU, executes the compiled code to produce one or more results, returns the one or more results to the host program, and executes the host program to process the one or more results.

33. The apparatus of claim 31,
wherein the one or more processors comprise a central processing unit (CPU) and a graphics processing unit (GPU),
wherein the CPU determines whether the compiled code is to be executed by the CPU or the GPU, and based on the determination that the compiled code is to be executed by the GPU, compiles the compiled code to generate low-level code that conforms to a low-level programming language supported by the GPU,
wherein the GPU executes the low-level code to generate a result and returns the result to the host program, and wherein the CPU executes the host program to process the result.

34. The apparatus of claim 23,
wherein the apparatus comprises a single portable device, and
wherein the one or more processors include a central processing unit (CPU) and a graphics processing unit (GPU) that both reside within the single portable device.

35. The apparatus of claim 34, wherein the single portable device includes a wireless communication device.

36. A non-transitory computer-readable medium storing instructions that, when executed, cause one or more processors to:
copy a first one of the two source files to the destination file, wherein the first one of the two source files includes a reference to a portion of a second one of the two source files, and wherein the second one of the two source files comprises a library of functions provided for copying the entire library of functions into the destination file only prior to execution of the destination file;
without executing any portion of the destination file, evaluate the destination file to determine whether the portion of the second one of the two source files referenced in the first one of the two source files is used by the destination file; and
based on the determination that the portion of the second one of the two source files referenced in the first one of the two source files is used by the destination file and rather than copy the entire second one of the two source files, selectively copy the portion of the second one of the two source files to the destination file to generate an updated destination file only prior to execution of the destination file.

37. The non-transitory computer-readable medium of claim 36, further storing instructions that, when executed, cause the one or more processors to copy only the portion of the second one of the two source files to the destination file to generate the updated destination file without copying those portions of the second one of the two source files not currently determined to be used by the destination file.

38. The non-transitory computer-readable medium of claim 37, further storing instructions that, when executed, cause the one or more processors to:
evaluate the updated destination file to determine whether the portion of the second one of the two source files selectively copied into the destination file to generate the updated destination file includes an additional reference to a portion of the two source files not yet copied into the updated destination file that is different from the portion of the second one of the two source files previously copied into the destination file to generate the updated destination file; and
in response to determining that the portion of the second one of the two source files selectively copied into the destination file to generate the updated destination file includes the additional reference to the different portion of any of the two source files not yet copied into the updated destination file, copy the different portion of any of the two source files into the updated destination file.

39. The non-transitory computer-readable medium of claim 37, further storing instructions that, when executed, cause the one or more processors to execute a host program that includes the first one of the two source files,
wherein the first one of the two source files comprises embedded un-compiled user-defined code, wherein the reference to the portion of the second one of two source files comprises a reference to a function of the library of functions, and wherein the destination file comprises compiled code.

40. The non-transitory computer-readable medium of claim 39, further storing instructions that, when executed, cause the one or more processors to, during execution of the host program, selectively copy at least one function of the library of functions to the destination file prior to performing post link optimization on the destination file.

41. The non-transitory computer-readable medium of claim 39, further storing instructions that, when executed, cause the one or more processors to determine whether a processor has a potential to execute the function of the library of functions referenced by the compiled code when executing the compiled code.

42. The non-transitory computer-readable medium of claim 39, wherein the compiled code comprises Intermediate Representation (IR) code, and wherein the non-transitory computer-readable medium further storing instructions that, when executed, cause the one or more processors to:

compile the IR code to generate low-level code that conforms to a low-level programming language supported by a graphics processing unit (GPU);

execute the low-level code with the GPU to generate a result;

return the result to the host program; and process the result with the host program.

43. The non-transitory computer-readable medium of claim 39, wherein the compiled code comprises low-level code that conforms to a low-level programming language supported by a processor, and wherein the non-transitory computer-readable medium further storing instructions that, when executed, cause the one or more processors to:

execute the low-level code with the processor to generate a result;

return the result to the host program; and process the result with the host program.

44. The non-transitory computer-readable medium of claim 39, wherein the host program further comprises additional compiled code that conforms to an Open Computing Language (OpenCL) framework, wherein the embedded un-compiled user-defined code also conforms to the OpenCL framework, and wherein the non-transitory computer-readable medium further storing instructions that, when executed, cause the one or more processors to:

execute the additional compiled code of the host program with a processor; and execute a compiler concurrently with the execution of the additional compiled code of the host program to compile the embedded un-compiled user-defined code so as to generate the compiled code.

45. The non-transitory computer-readable medium of claim 44, further storing instructions that, when executed, cause the one or more processors to:

determine whether the compiled code is to be executed by a processor or a graphics processing unit (GPU);

based on the determination that the compiled code is to be executed by the processor, output the compiled code to the processor;

execute the compiled code with the processor to produce one or more results;

return the one or more results to the host program; and process the one or more results with the host program.

46. The non-transitory computer-readable medium of claim 44, further storing instructions that, when executed, cause the one or more processors to:

determine whether the compiled code is to be executed by a processor or a graphics processing unit (GPU);

based on the determination that the compiled code is to be executed by the GPU, compile the compiled code to generate low-level code that conforms to a low-level programming language supported by the GPU;

execute the low-level code with the GPU to generate a result;

return the result to the host program; and process the result with the host program.

* * * * *